United States Patent

Beling

[15] 3,643,134

[45] Feb. 15, 1972

[54] METER VANE POSITION SENSING CONTROLLER

[72] Inventor: Thomas E. Beling, Framingham, Mass.

[73] Assignee: Sigma Instruments, Inc., South Braintree, Mass.

[22] Filed: Oct. 22, 1970

[21] Appl. No.: 83,033

[52] U.S. Cl............317/148.5 R, 317/148.5 B, 317/DIG. 2, 340/266
[51] Int. Cl..................................H01h 47/32, G08b 21/00
[58] Field of Search...............317/148.5 R, 148.5 B, DIG. 2; 340/266

[56] References Cited

UNITED STATES PATENTS

| | | | |
|---|---|---|---|
| 2,889,496 | 6/1959 | Moore, Jr. | 317/148.5 R |
| 2,894,179 | 7/1959 | Knudsen | 317/148.5 R |
| 2,935,661 | 5/1960 | Quick | 317/148.5 R |
| 2,947,875 | 8/1960 | Beck | 317/148.5 R |
| 3,009,101 | 11/1961 | Locher | 317/DIG. 2 |
| 3,032,692 | 5/1962 | Mulligan | 317/DIG. 2 |
| 3,196,321 | 7/1965 | Crowdes | 317/148.5 R |

Primary Examiner—L. T. Hix
Attorney—McGlew and Toren

[57] ABSTRACT

A meter movement controller has a movable meter vane, in the form of a disk of electrically conductive metal, movable between transmitting and sensor plates of a condenser to vary the transfer of energy between the plates. An SCR is arranged to be connected, in series with a diode, across a low-voltage source of AC potential at commercial frequency, and its anode is connected to the transmitting plate through a further condenser. A voltage divider is connected across the source in series with the diode, and the junction of the voltage divider is connected to the gate of the SCR. When the positive half wave of AC potential reaches a preselected potential, such as 100 volts, a triggering pulse is applied to the gate of the SCR to trigger the SCR conductive. This applies a 100-volt pulse to the transmitting plate of the condenser. A transistor amplifier, including a second SCR, connects the sensor plate to a control means, such as a relay winding. The relay winding is thus energized as a function of the transfer of energy between the condenser plates as modulated as a function of the position of the meter vane.

10 Claims, 1 Drawing Figure

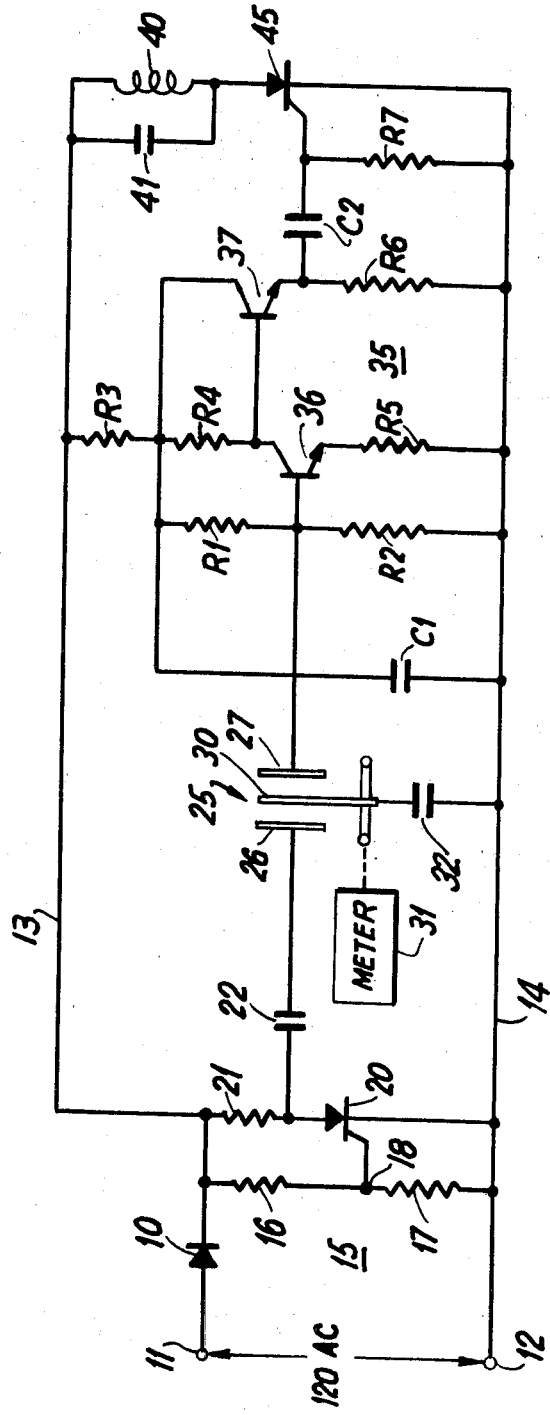

METER VANE POSITION SENSING CONTROLLER

BACKGROUND OF THE INVENTION

Meter movement controllers, of the contactless variety, usually sense the meter position by one of three methods. One method involves optical sensing, in which the meter vane interrupts a light beam directed on a photosensitive device. A second method uses inductive coupling, in which a high-frequency magnetic coupling between two windings is altered by a metallic meter vane. The third method usually used involves capacitive coupling, wherein the transfer of high-frequency energy from an oscillator circuit is modulated or altered by a metallic meter vane.

While all three generally used arrangements are effective to perform the desired control, they require components and the like which are relatively expensive, and additionally are somewhat complicated in their circuitry.

SUMMARY OF THE INVENTION

This invention relates to a meter movement controller of the contactless type and, more particularly, to an improved meter movement controller using capacitive coupling with the input voltage in the form of large amplitude pulses.

In accordance with the invention, a series of large amplitude pulses are applied to a transmitting plate or electrode of a condenser having a pickup or sensor plate or electrode. A meter vane, of electrically conductive metal, is coupled to electrical neutral and is movable between the condenser electrodes or plates to vary or modulate the transfer of energy therebetween. A transistorized amplifier, including an SCR, connects the sensor electrode to a control means, such as a relay coil. The relay coil is thus energized as a function of the transfer of energy between the transmitting and sensor electrodes of the condenser and, in turn, this is a function of the position of the meter vane between these plates or electrodes.

To provide the large amplitude pulses, a main SCR is connected across a low-voltage source of AC potential of commercial frequency in series with a diode, and a voltage divider is also connected across this source in series with the diode. A junction on the voltage divider is connected to the gate of the main SCR, and the anode of the SCR is connected to the transmitting electrode of the condenser. When a positive half wave of the AC source attains a potential of 100 volts, for example, the voltage divider applies a pulse to the main SCR to trigger the latter conductive. In turn, this applies the 100-volt pulse, for example, to the transmitting plate or electrode of the condenser. The meter controller thus needs only a usual commercial AC source for energization, and involves very simple solid state circuitry for energizing a control means in accordance with the position of a meter vane.

An object of the invention is to provide an improved meter movement controller.

Another object of the invention is to provide such a meter movement controller involving a capacitive coupling and supplied with an input voltage in the form of large amplitude, fast-rising pulses.

A further object of the invention is to provide such a meter movement controller which is simple, inexpensive, and utilizes solid-state circuitry.

For an understanding of the principles of the invention, reference is made to the following description of a typical embodiment thereof as illustrated in the accompanying drawing.

BRIEF DESCRIPTION OF THE DRAWING

In the drawing, the single FIGURE is a schematic wiring diagram of a meter movement controller embodying the invention.

DESCRIPTION OF THE PREFERRED EMBODIMENT

Referring to the drawing, the illustrated meter movement controller has terminals 11 and 12 arranged for connection across a low-voltage source of AC potential, such as a 120-volt AC source at 60 cycles. Terminal 11 is connected through a diode 10 to a conductor 13, and terminal 12 is connected to a neutral conductor 14. A voltage divider 15 is connected across the AC source in series with diode 10, and includes resistances 16 and 17 interconnected at a junction point or tap 18. An SCR 20 is connected between terminals 11 and 12 in series with diode 10 and a resistance 21, and the gate of SCR 20 is connected to junction point or tap 18 of voltage divider 15.

The anode of SCR 20 is connected, through a condenser 22, to the transmitting plate or electrode 26 of a main condenser 25 including a sensor plate or electrode 27. A movable meter vane 30 of electrically conductive metal, coupled to electrical neutral 14 either through capacitor 32 or directly, forms part of a meter 31 and is interposed between electrodes 26 and 27 of condenser 25 so that the transfer of energy between electrodes 26 and 27 is modulated or varied in accordance with the position of meter vane 30.

The energy transferred from electrode 26 to electrode 27, as modulated or changed by the position of vane 30, is used to control energization of relay winding 40 connected between conductors 13 and 14 in series with the second SCR 45, a smoothing condenser 41 being connected in parallel with relay coil or winding 40. Triggering of SCR 45 is effected by a transistor amplifier 35 connected between sensor electrode 27 of main condenser 25 and the gate of SCR 45. Amplifier 35 includes cascade connected NPN-transistors 36 and 37 with associated resistors R1–R6 and a condenser C1. A condenser C2 connects the emitter of transistor 37 to the gate of SCR 45, and a resistor R7 is connected between this gate and conductor 14.

In response to a predetermined transfer of energy between condenser electrodes 26 and 27, as determined by the position of vane 30, the transistor amplifier supplies a signal to the gate of SCR 45 to trigger SCR 45 conductive thus, in effect, connecting relay winding 40 between conductors 13 and 14 to energize the relay winding. For example, relay winding 40 may be energized at a predetermined high meter reading, to effect an appropriate control function through the operation of relay contacts or the like. As stated, the meter movement controller of the invention is simple and inexpensive and comprises long life solid-state components. While operating upon the capacitive coupling principle, it does not require a high-frequency AC input but is usable with an ordinary commercial AC input, such as 120-volt supply at 60 cycles. Nevertheless, the capacitive coupling is effected by a series of large amplitude pulses.

While a specific embodiment of the invention has been shown and described in detail to illustrate the application of the principles of the invention, it will be understood that the invention may be embodied otherwise without departing from such principles.

What is claimed is:

1. A meter movement controller, utilizing a meter having a movable vane, comprising, in combination, a movable vane of electrically conductive metal; a condenser having a transmitting electrode and a sensor electrode; said vane being movable between and parallel to said electrodes to vary the transfer of energy between said electrodes as a function of the position of said vane; pulse generating means connected to said transmitting electrode and operable to apply, to said transmitting electrode, a series of large amplitude pulses; control means; and an energy transfer detecting circuit connecting said control means to said sensor electrode and operable to effect energization of said control means as a function of the position of said vane.

2. A meter movement controller, as claimed in claim 1, in which said pulse generating means comprises an SCR arranged to be connected across a source of AC potential having an electrical neutral and to said transmitting electrode; and means operable, responsive to instantaneous potentials of said source, to trigger said SCR conductive.

3. A meter movement controller, as claimed in claim 2, including a diode connected between one terminal of the source and said SCR.

4. A meter movement controller, as claimed in claim 3, in which said instantaneous potential responsive means comprises a voltage divider connected in series with said diode and in parallel with said SCR; and means connecting a tap of said voltage divider to the gate of said SCR.

5. A meter movement controller, as claimed in claim 4, including a capacitor connected between the anode of said SCR and said transmitting electrode.

6. A meter movement controller, as claimed in claim 5, including a second capacitor connected between said vane and electrical neutral.

7. A meter movement controller, as claimed in claim 4, in which said energy transfer detecting circuit comprises a transistor amplifier connected between said sensor electrode and said control means and controlling energization of said control means.

8. A meter movement controller, as claimed in claim 7, including a second SCR connected, in series with said control means, across the source; and means applying the output of said amplifier to the gate of said second SCR.

9. A meter movement controller, as claimed in claim 8, in which said control means comprises a relay winding shunted by a capacitor.

10. A meter movement controller, as claimed in claim 9, in which said means applying the output of said amplifier to the gate of said second SCR comprises a capacitor connected between said amplifier and said gate.

* * * * *